US011196735B2

(12) United States Patent
Rahman et al.

(10) Patent No.: US 11,196,735 B2
(45) Date of Patent: Dec. 7, 2021

(54) CERTIFICATE MANAGEMENT IN SEGREGATED COMPUTER NETWORKS

(71) Applicant: Microsoft Technology Licensing, LLC, Redmond, WA (US)

(72) Inventors: Soumit Rahman, Seattle, WA (US); Benjamin Rybalka, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 195 days.

(21) Appl. No.: 16/514,741

(22) Filed: Jul. 17, 2019

(65) Prior Publication Data

US 2021/0021585 A1  Jan. 21, 2021

(51) Int. Cl.
*H04L 29/06* (2006.01)
*H04L 29/12* (2006.01)
*H04L 29/08* (2006.01)

(52) U.S. Cl.
CPC ........ *H04L 63/0823* (2013.01); *H04L 61/255* (2013.01); *H04L 63/0272* (2013.01); *H04L 63/123* (2013.01); *H04L 67/34* (2013.01)

(58) Field of Classification Search
CPC .............................. H04L 61/255; H04L 67/34
See application file for complete search history.

(56) References Cited

U.S. PATENT DOCUMENTS 8,549,300 B1  10/2013  Kumar et al.
8,984,275 B2   3/2015  Ozgit
9,189,376 B2  11/2015  Jayaraman et al.
10,164,966 B2 12/2018  Wilson
10,447,682 B1 * 10/2019 Du Lac ................. H04L 9/3247
(Continued)

FOREIGN PATENT DOCUMENTS

WO        2018053072 A1    3/2018

OTHER PUBLICATIONS

Dearle et al., "A Flexible and Secure Deployment Framework for Distributed Applications ", published by Springer-Verlag Berlin, Heidelberg 2004, pp. 219-233 (Year: 2004).*
(Continued)

*Primary Examiner* — S. Sough
*Assistant Examiner* — Zheng Wei
(74) *Attorney, Agent, or Firm* — Liang IP, PLLC (57) ABSTRACT

Techniques for managing certificates in segregated networks are disclosed. One example technique includes upon receiving executable instructions of a software application and a reference table containing entries of reference objects in the software application, identifying a digital certificate independently obtained by the segregated network for each of the reference objects. The method also includes generating a mapping table having entries individually identifying the reference objects and data representing the digital certificates. The method further includes deploying for execution to one or more of the servers in the segregated network, the software application along with the generated mapping table. During execution, the software application can dereference one of the reference objects to locate one of the digital certificates in in the generated mapping table corresponding to one of the reference objects.

20 Claims, 8 Drawing Sheets

(56) References Cited

U.S. PATENT DOCUMENTS

| | | | | |
|---|---|---|---|---|
| 2005/0282637 | A1* | 12/2005 | Gatto | G06F 8/61 463/42 |
| 2012/0005480 | A1* | 1/2012 | Batke | G06F 21/44 713/175 |
| 2013/0167136 | A1* | 6/2013 | Goldman | G06F 8/61 717/175 |
| 2013/0232498 | A1 | 9/2013 | Mangtani et al. | |
| 2015/0121078 | A1* | 4/2015 | Fu | G06F 21/30 713/175 |
| 2015/0222602 | A1* | 8/2015 | Steiner | H04K 3/22 713/168 |
| 2016/0241583 | A1 | 8/2016 | Kowalczyk et al. | |
| 2017/0228412 | A1* | 8/2017 | Agarwal | H04L 63/0823 |
| 2018/0083937 | A1* | 3/2018 | Jahner | G06F 21/45 |
| 2018/0091510 | A1* | 3/2018 | Erez | H04L 63/0209 |
| 2018/0262347 | A1* | 9/2018 | Levy | H04L 9/006 |
| 2018/0329693 | A1* | 11/2018 | Eksten | G06F 16/21 |
| 2020/0028848 | A1* | 1/2020 | Gupta | H04L 63/0823 |

OTHER PUBLICATIONS

"Announcing the New AWS Secret Region", Retrieved From https://aws.amazon.com/blogs/publicsector/announcing-the-new-aws-secret-region/, Nov. 20, 2017, 4 Pages.

"Encryption in Transit in Google Cloud", Retrieved From https://web.archive.org/web/20190331035248/https:/cloud.google.com/security/encryption-in-transit/, Mar. 31, 2019, 27 Pages.

"JAB Authorized, Fully Managed Compliance Platform", Retrieved From https://www.rackspace.com/en-in/fedramp, Retrieved Date May 14, 2019, 3 Pages.

"Remote Automated Airgap Security (RAAS™): Introducing RAAS™ Technology", Retrieved From https://web.archive.org/web/20190507023600/https:/www.goldilock.com/, May 7, 2019, 10 Pages.

"International Search Report and Written Opinion Issued in PCT Application No. PCT/US20/033485", dated Sep. 17, 2020, 11 Pages.

* cited by examiner

CERTIFICATE MANAGEMENT IN SEGREGATED COMPUTER NETWORKS

BACKGROUND

A computer network is a digital communication system that allows computing devices in the computer network to share data and/or resources. In a computer network, computing devices can exchange digital data using physical and logical connections to provide cloud computing, electronic commerce, media dissemination, or other computing services. Some computer networks are public while others are private. For example, the Internet is a public network while local area networks (LANs) in corporations, government entities, and other organizations may be private. To provide network security, private computer networks typically implement various security policies and practices to prevent unauthorized access, misuse, or modification of network-accessible resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Air gapping is a network security technique to ensure that a computer network is physically isolated or segregated (referred to herein as a "segregated network") from unsecured networks, such as the Internet or other external computer networks. To implement air gapping, computers in a segregated network typically do not include or have disabled any wired and wireless network interfaces that are connectable to external computer networks. To move data from an external computer network to a segregated network, data is typically streamed via an infrared, fiber optic, or other suitable types of unidirectional network connection. As such, no data from the segregated network may be egressed to an external computing environment.

Network security techniques, such as air gapping, implemented to isolate computer networks can cause certain difficulties when developing software applications for segregated networks. For example, certain software applications can include one or more components that consume digital secrets, such as digital signatures, digital certificates, cryptography keys, fingerprint or thumbprint of cryptography keys, etc. Normally, a development team can obtain and/or otherwise receive information regarding such digital secrets and hardcode or otherwise directly reference the digital secrets in source code of software applications. However, such a programming technique may not be available for segregated networks because segregated networks do not provide any data (e.g., digital secrets) to the external computing environment, nor do the segregated networks accept externally provided digital secrets. Thus, such tight data security measures of segregated network may present a difficulty for developing and deploying software applications in such segregated networks.

Several embodiments of the disclosed technology can address certain aspects of the foregoing difficulty by decoupling acquisition of digital secrets from referencing the digital secrets in software applications. In one implementation, instead of referencing a digital secret directly in source code, a software application can be configured to represent and reference an unknown digital secret with a placeholder or "reference object" for the digital secret. As used herein, a "reference object" generally refers to a software object that references an instance of another software object, such as a digital secret. During compiling or other suitable stages of developing a software application, a list of reference objects used in the software application can be generated. The list of reference objects can then be transmitted, via a unidirectional network connection, to a segregated network. In response, an administrator or an administrative server at the segregated network can procure or otherwise provision digital secrets corresponding to the individual reference objects from a suitable certificate authority. The administrative server can then store the acquired digital secrets as well as records of corresponding reference objects (referred to as "reference records") in a datastore in the segregated network. None of the acquired digital secrets are transmitted to the external computing environment.

During application deployment, the software application can be streamed from the external computing environment to the segregated network via the same or different unidirectional connection therebetween. In one implementation, the software application can include a table (referred to herein as "reference table") having one or more entries individually identifying a reference object for a digital secret and a component of the software application that consumes the digital secret. In another implementation, the administrative server can be configured to scan the software application and generate the reference table upon receiving the software application. In further implementations, the reference table can be generated manually by an administrator at the segregated network or generated in other suitable manners.

Upon receiving or otherwise obtaining the reference table, the administrative server at the segregated network can be configured to determine whether a digital secret that corresponds to a reference object in the reference table is already present and valid in the datastore according to the reference records. Upon determining that a corresponding digital secret is present and valid in the datastore, the administrative server can be configured to generate a mapping table having entries individually identifying the reference object, the corresponding digital secret, one or more components of the digital secret (e.g., a public key, a private key, a digital signature, a fingerprint, etc.), a validation status, a renewal date/time, and/or other suitable information. Upon determining that a corresponding digital secret is not present or is invalid in the datastore, the administrative server can be configured to procure, update, or otherwise provision, from a suitable certificate authority, another digital secret corresponding to the reference object. The administrative server can then store the acquired digital secret as well as a record of the corresponding reference object in the datastore, and create an entry for the reference object in the mapping table, as described above.

The administrative server can then be configured to combine the mapping table with the received software application into a software package and deploy the software package to one or more execution servers in the segregated network. During runtime, an execution server in the segregated network can execute instructions in the software application that consume a digital secret referenced by a reference object. In response, the execution server can be configured to perform a lookup of the mapping table to locate a corresponding digital secret for the reference object. The execution server can then be configured to consume the digital secret from the mapping table and continue execution of the software application by, for instance, authenticating a component of the software application using the digital secret.

Several embodiments of the disclosed technology can thus allow ready deployment of software applications that utilize digital secrets in segregated networks without compromising data security of the segregated networks. Instead of referencing digital secrets directly, embodiments of the disclosed technology implement placeholders or reference objects in source code of software applications. Upon receiving a list of reference objects, the administrative server in the segregated network can independently acquire, renew, or otherwise obtain digital secrets corresponding to the individual reference objects. A mapping table can then be generated that identify individual reference objects and corresponding digital secrets independently acquired by the segregated network. During execution, the reference objects can be de-referenced based on the mapping table to allow ready execution of the software application.

Several embodiments of the disclosed technology can also enable ready updates or other suitable management operations of digital certificates in a computer network. For example, when an existing digital secret is compromised, expired, or otherwise invalid, to update the digital secret, source code of the software application may need to be changed if the digital secret is referenced directly in the source code. In contrast, embodiments of the disclosed technology can allow ready updating of an existing digital secret by modifying an entry in the mapping table that corresponds to the existing reference object without having to modify the source code of the software application. As such, segregated or other suitable types of computer networks can independently and efficiently manage digital secrets for the software applications without source code modifications.

DETAILED DESCRIPTION

Certain embodiments of systems, devices, components, modules, routines, data structures, and processes for certificate management in segregated networks are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

As used herein, the term "segregated network" generally refers to a computer network having interconnected servers or other suitable types of computing devices that are physically isolated from unsecured networks, such as the Internet or other external computer networks. A segregated network may have little or no data egress from any of the computing devices in the segregated network to any external computer networks, and may receive data (e.g., software applications) from external computer networks via unidirectional connections. To provide network security, a segregated network can implement various security policies and practices to prevent unauthorized access, misuse, or modification of network-accessible resources. For example, a segregated network can implement air gapping according to which computing devices, such as servers, in a segregated network do not include or have disabled any wired and wireless network interfaces that are connectable to external computer networks. To move data from external computer networks to a segregated network, data can only be streamed via an infrared, fiber optic, or other suitable types of unidirectional connection. As such, little or no data from the segregated network may be egressed to an external computing environment.

Also used herein, a "reference object" generally refers to a software object that references or refers to an instance of another software object (referred to as "target object"), via, for example, a pointer. In various implementations, a reference object can point to a file (e.g., a digital certificate), an item (e.g., a thumbprint of a digital certificate), or a combination thereof. For example, a reference object can include a pointer that points to an instance of a digital certificate available in a segregated network. During execution of a software application having a reference object, the reference object can be dereferenced by identifying and locating the instance of the object according to the pointer of the reference object. An example reference object is a moniker according to Component Object Model (COM) of Object Linking and Embedding (OLE) provided by Microsoft Corporation of Redmond, Wash.

As used herein a "digital secret" generally refers to digital data usable for authentication, verification, or other suitable purposes. Examples of digital secret can include a public key, a private key, a digital certificate that attest ownership of a public key, a thumbprint or fingerprint that is a short sequence of bytes used to identify a public key, a digital signature that attest to authenticity of an associated digital document, or other suitable types of digital data. A digital secret can also include metadata associated with one or more of the foregoing examples. Example metadata can include an organization that a digital secret is issued to, an issue date, an expiration date, or other suitable information.

Network security techniques, such as air gapping, implemented to isolate computer networks can cause certain difficulties when developing software applications for such isolated networks. For example, certain software applications can include one or more components that consume digital secrets, such as digital signatures, digital certificates, cryptography keys, fingerprint or thumbprint of cryptography keys, etc. Normally, a development team can obtain and/or otherwise receive information regarding such digital secrets and hardcode or otherwise directly reference the digital secrets in source code of software applications. However, such a programming technique may not be available for isolated networks because isolated networks do not provide any data (e.g., digital secrets) to the external computing environment, nor do the segregated networks accept externally provided digital secrets. Thus, such data security measures of segregated network may present a difficulty for developing and deploying software applications in such segregated networks.

Several embodiments of the disclosed technology can address certain aspects of the foregoing difficulty by decoupling acquisition of digital secrets from referencing the digital secrets in software applications. In one implementation, instead of referencing a digital secret directly in source code, a software application can be configured to represent and reference an unknown digital secret with a reference object. Prior to deployment of the software application in a segregated network, an administrative server in the segregated network can be configured to provision suitable digital secrets independently and associate the provisioned digital secrets with the reference objects in the software application as entries in a mapping table. As such, several embodiments of the disclosed technology can allow ready deployment of software applications that utilize digital secrets unknown to the development team without compromising data security of the segregated networks. Several embodiments of the disclosed technology can also enable ready updates or other suitable management operations of digital certificates in a computer network. When an existing digital secret is compromised, expired, or otherwise invalid, to update the digital secret, entries in the mapping table may be updated without modification to the source code of the software application, as described in more detail below with reference to FIGS. 1A-5.

Figure 1A:
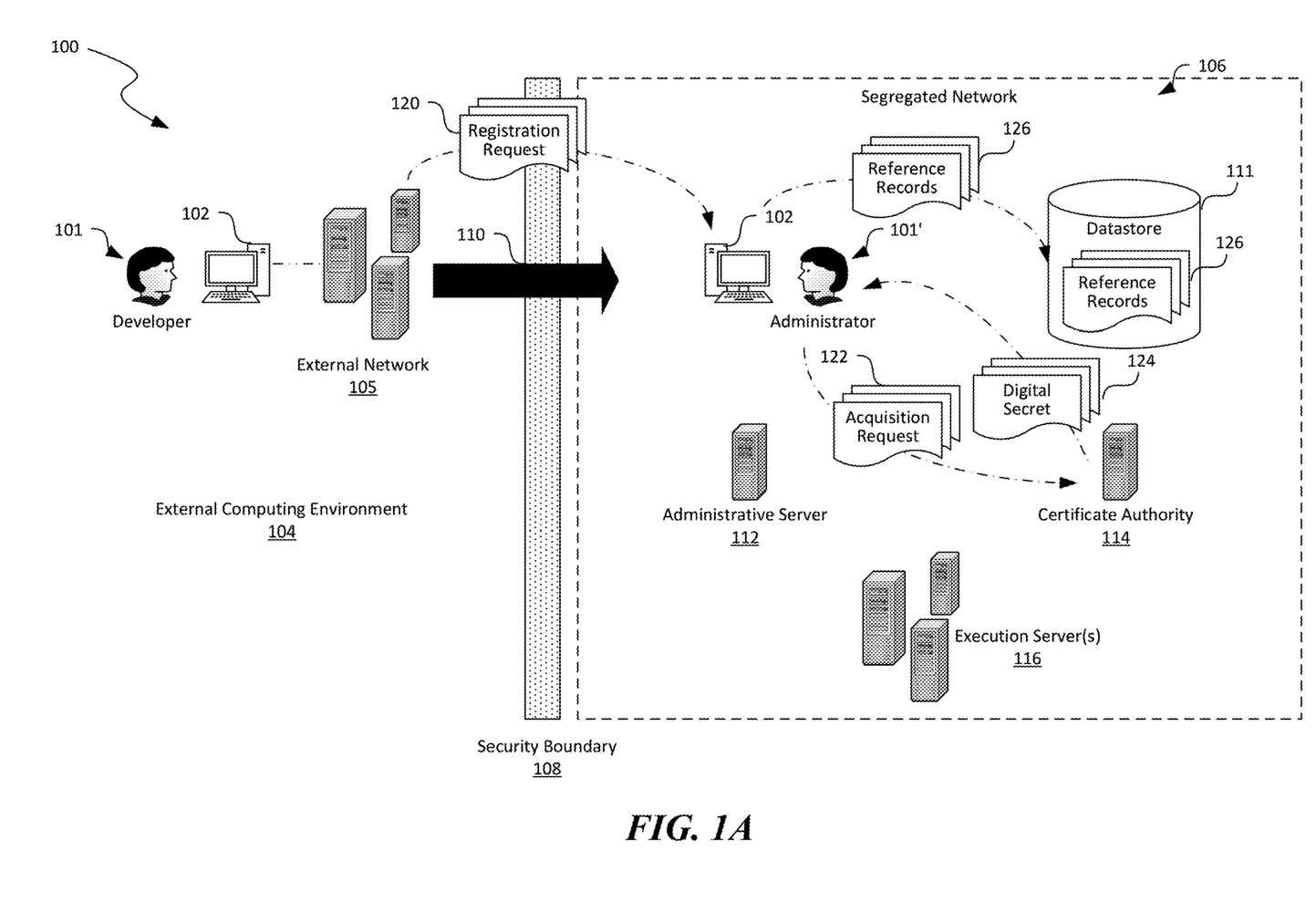
FIGS. 1A-1D are schematic diagrams illustrating a computing system implementing certificate management for a segregated network during certain stages of operation in accordance with embodiments of the disclosed technology.

FIGS. 1A-1D are schematic diagrams illustrating a computing system 100 implementing certificate management in segregated networks during certain stages of operation in accordance with embodiments of the disclosed technology. Not all components are shown in each of FIGS. 1A-1D for clarity. In FIG. 1A and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the computing system 100 can include a segregated network 106 isolated from an external computing environment 104 by a security boundary 108. In the illustrated example, the external computing environment 104 includes an external network 105 accessible by a developer 101 via a client device 102. The external network 105 can include suitable servers, routers, switches, load balancers, and/or other suitable devices. The developer 101 can utilize the external network 105 to develop and provide for deployment a software application 128 (shown in FIG. 1B) in the segregated network 106, as described in more detail below. In other examples, the external computing environment 104 can include additional and/or different external networks, computing devices, or other suitable components.

The client devices 102 can include a computing device that facilitates the developer 101 in performing various tasks, such as developing and providing for deployment the software application 128. In the illustrated embodiment, the client device 102 includes a desktop computer. In other embodiments, the client device 102 can also include a laptop computer, tablet computer, smartphone, or other suitable types of computing device. Though one developer 101 is shown in FIG. 1A for illustration purposes, in other embodiments, the external network 105 can facilitate operations of a developer team, multiple developer teams, or any other suitable numbers of developers 101 or developer teams.

The security boundary 108 can be a physical and/or logical boundary between the external computing environment 104 and the segregated network 106 to provide a unidirectional connection 110 that limits or prevents data egress from the segregated network 106 to the external computing environment 104. In one example, the security boundary 108 can include a physical boundary that has an infrared transmitter configured to receive data from the external computing environment and transmit the received data to a receiver at the segregated network. The receiver is configured to receive the transmitted data signals and provide the received data from the external computing environment 104 to the segregated network 106. In other examples, the security boundary 108 can include a logically implemented unidirectional connection 110 or "data diode" that allows data to travel in only one direction.

As shown in FIG. 1A, the segregated network 106 can include an administrator 101' with a client device 102, an administrative server 112, a certificate authority 114, a datastore 111 having reference records 126, and one or more execution servers 116 operatively coupled to one another. Even though particular components of the segregated network 106 are shown in FIG. 1A for illustration purposes, in other implementations, the segregated network 106 can also include routers, switches, and/or other suitable additional or different components.

In the illustrated embodiment, the administrator 101' with the client device 102 are shown for provisioning digital secrets 124 independently inside the segregated network 106. For example, the developer 101 can utilize the external network 105 to transmit, via the unidirectional connection 110, a registration request 120 containing a list of reference objects used in the software application 128 to the administrator 101'. In response, the administrator 101' can utilize the client device 102 and other components of the segregated network 106 to transmit an acquisition request 122 for corresponding digital secrets 124 to the certificate authority 114. In response, the certificate authority 114 can provide requested digital secrets 124 to the administrator 101' who subsequently create and store in the datastore 111 reference records 126. The individual reference records 126 identify a reference object and a corresponding digital secret acquired for the reference object from the certificate authority 114.

Figure 1B:
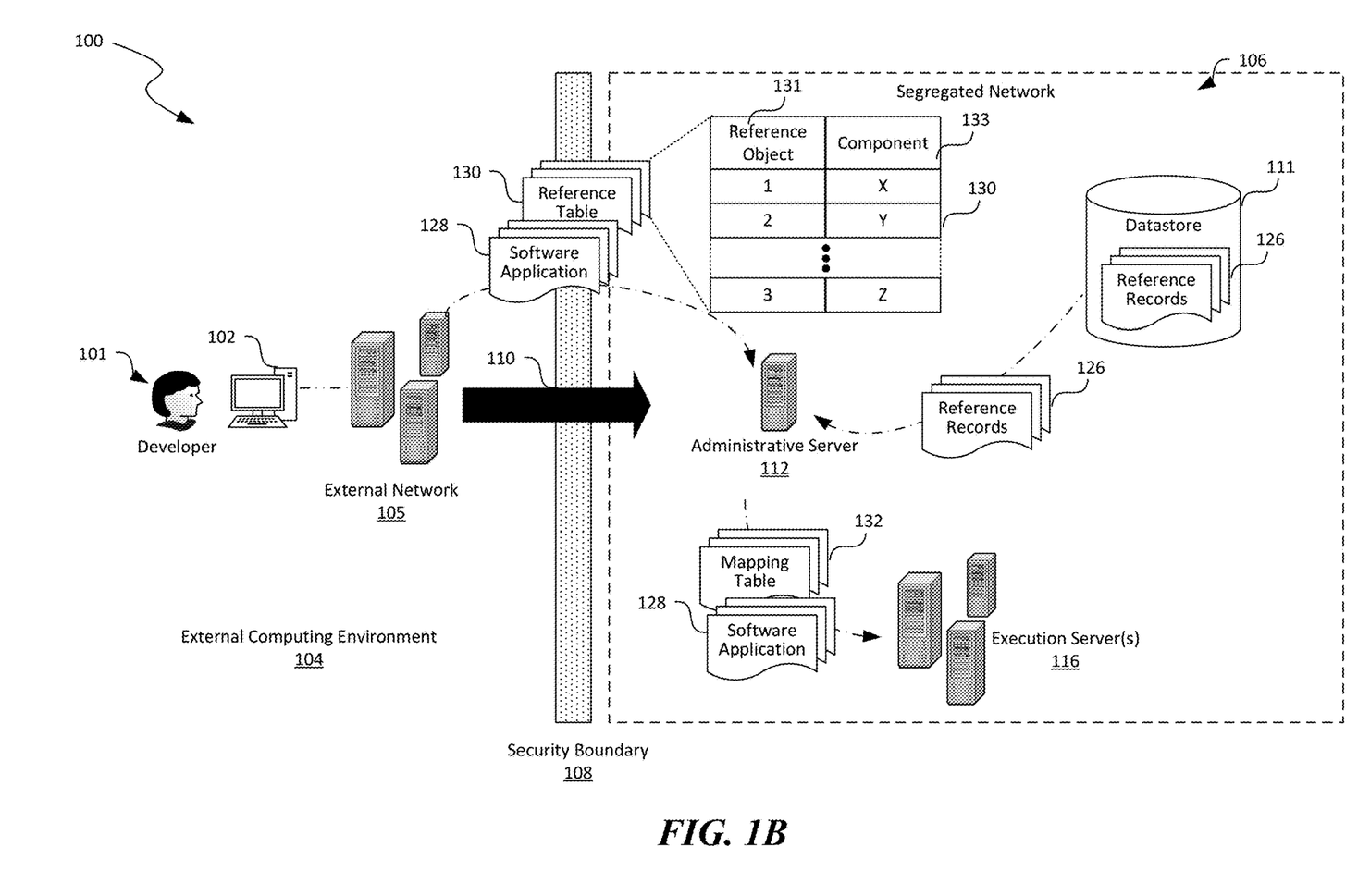

The administrative server 112 can be configured to facilitate deployment of the software application 128 received from the external network 105 in the segregated network 106. For example, as shown in FIG. 1B, the developer 101 can provide executable instructions of the software application 128 to the administrative server 112 of the segregated network 106 via the unidirectional connection 110. In the illustrated embodiment, the provided software application 128 includes a reference table 130 that identifies a list of reference objects 131 and corresponding components 133 that contains the reference objects 131 in the software application 128. For example, the reference objects 131 are identified with an integer (i.e., "1," "2," and "3") while the corresponding components 133 are identified with letters (i.e., "X," "Y," and "Z"). In other embodiments, the software application 128 can be provided to the segregated network 106 with the reference objects 131 in a list, sorted list, or other suitable data structures instead of the reference table 130. Instead, the administrative server 112 (or another suitable component of the segregated network 106) can be configured to scan and identify the reference objects 131. In further embodiments, the reference objects 131 can be generated and/or provided to the segregated network 106 in other suitable manners.

Upon obtaining the reference table 130, the administrative server 112 can be configured to determine whether a corresponding digital secret 124 (shown in FIG. 1A) has been provisioned for one of the reference objects 131 in the reference table 130. For example, as shown in FIG. 1B, the administrative server 112 can search the reference records 126 in the datastore 111 and determine whether a reference record 126 exists for a reference object 131. In response to determining that a reference record 126 exists, the administrative server 112 can be configured to determine whether the corresponding digital secret 124 in the reference record 126 is still valid.

Figure 1C:
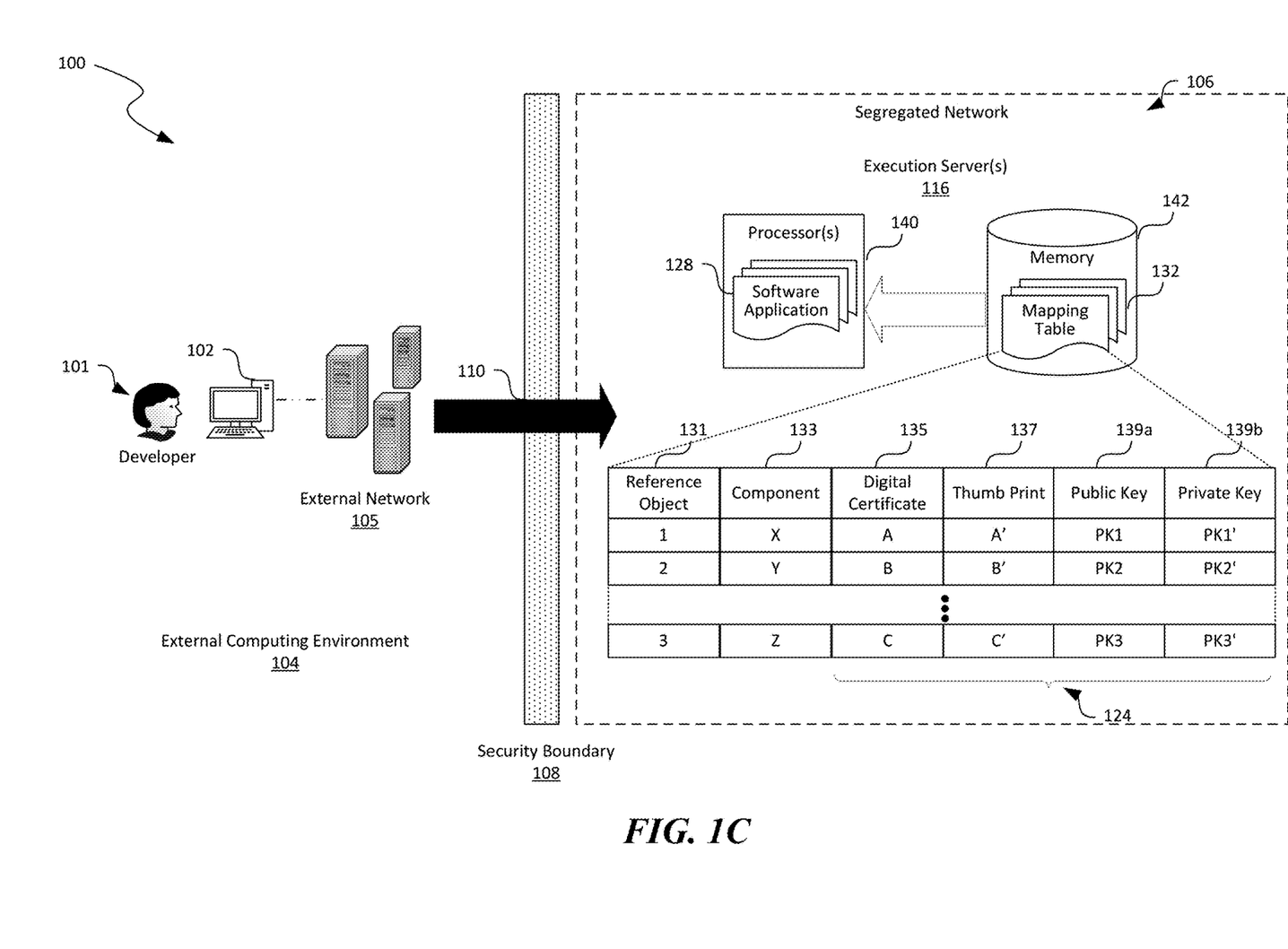
Figure 1D:
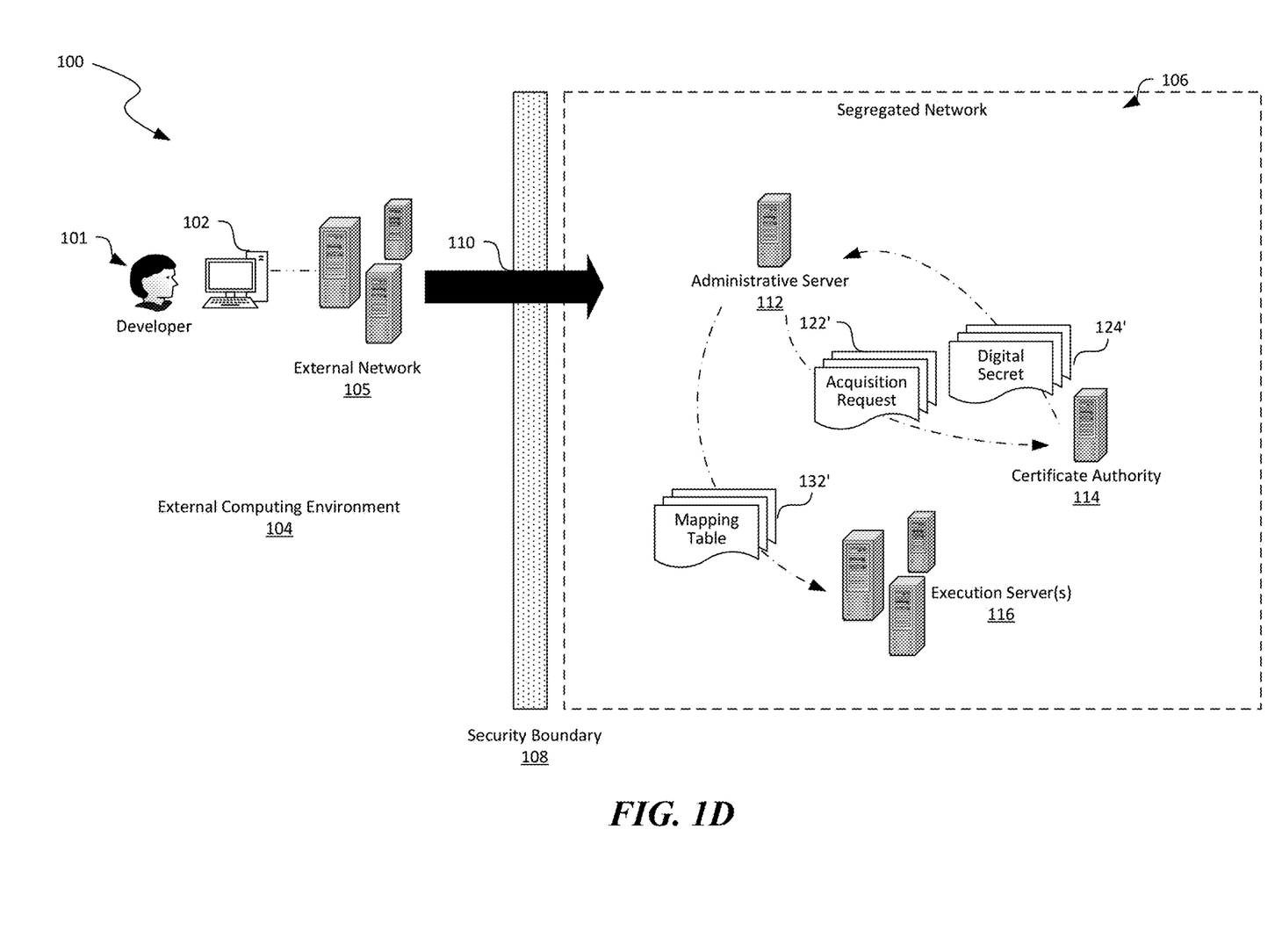

In response to determining that the digital secret 124 is valid, the administrative server 112 can be configured to generate a mapping table 132 (shown in FIG. 1C) that contains entries of the reference objects 131 and various components of the corresponding digital secret 124. In response to determining that a reference record 126 does not already exists in the datastore 1112, or the digital secret 124 in the existing reference record 126 is invalid (e.g., expired, compromised, etc.), the administrative server 112 can be configured to update or otherwise re-provision another instance of a digital secret 124 from the certificate authority 114, as described in more detail below with reference to FIG. 1 D.

Upon completion of generating the mapping table 132, the administrative server 112 can be configured to deploy the software application 128 with the generated mapping table 132 to one or more of the execution servers 116. Example components of the administrative server 112 are described in more detail below with reference to FIG. 2. Though the administrative server 112 is shown in FIGS. 1A and 1B as being separate from the execution servers 116, in certain implementations, the administrative server 112 can be one of the execution servers 116 or a computing service provided by one or more of the execution servers 116.

Based on the received software application 128 and the mapping table 132, one or more of the execution servers 116 can be configured to execute the software application 128 to provide suitable computing services to users (not shown) in the segregated network 106. For example, as shown in FIG. 1C, an execution server 116 can include a processor 140 operatively coupled to a memory 142 containing the mapping table 132. In the illustrated example, the mapping table 132 can include multiple entries individually identifying a reference object 131, a component 133, and one or more components of digital secret 124 (FIG. 1A). For instance, the components of the digital secret 124 can include a digital certificate 135, a thumbprint 137, a public key 139a and a private key 139b. In other examples, the components of the digital secret 124 can also include an organization name, an issue date, an expiration date, and/or other suitable information.

During execution of the software application 128, the processor 140 can be configured to identify a reference object 131. In response, the processor 140 can be configured to look up an entry in the mapping table 132 to locate one or more components of a corresponding digital secret 124. The processor 140 can then be configured to retrieve the located one or more components of the digital secret 124 and perform authentication, verification, or other suitable operations to continue execution of the software application 128. As such, the software application 128 can be developed by the developer 101 and readily deployed in the segregated network 106 even though the various digital secrets 124 are unknown to the developer 101.

By using the mapping table 132 to indirectly reference the digital secrets 124, several embodiments of the computing system 100 can also allow efficient update or other management tasks of the digital secrets 124. For example, as shown in FIG. 1D, subsequent to deploying the software application 128 (FIG. 1C) to one or more of the execution servers 116, the administrative server 112 can be configured to determine that one of the digital secrets 124 in the mapping table 132 has expired, compromised, or otherwise becoming invalid. In response, the administrative server 112 can be configured to acquire a new digital secret 124' by transmitting, to the certificate authority 114, another acquisition request 122'. The administrative server 112 can then be configured to update the mapping table 132 with the new digital secret 124 as corresponding to one of the reference objects 131. As such, digital secrets 124 consumable by the software application 128 can be updated without updating source code of the software application 128.

Figure 2:
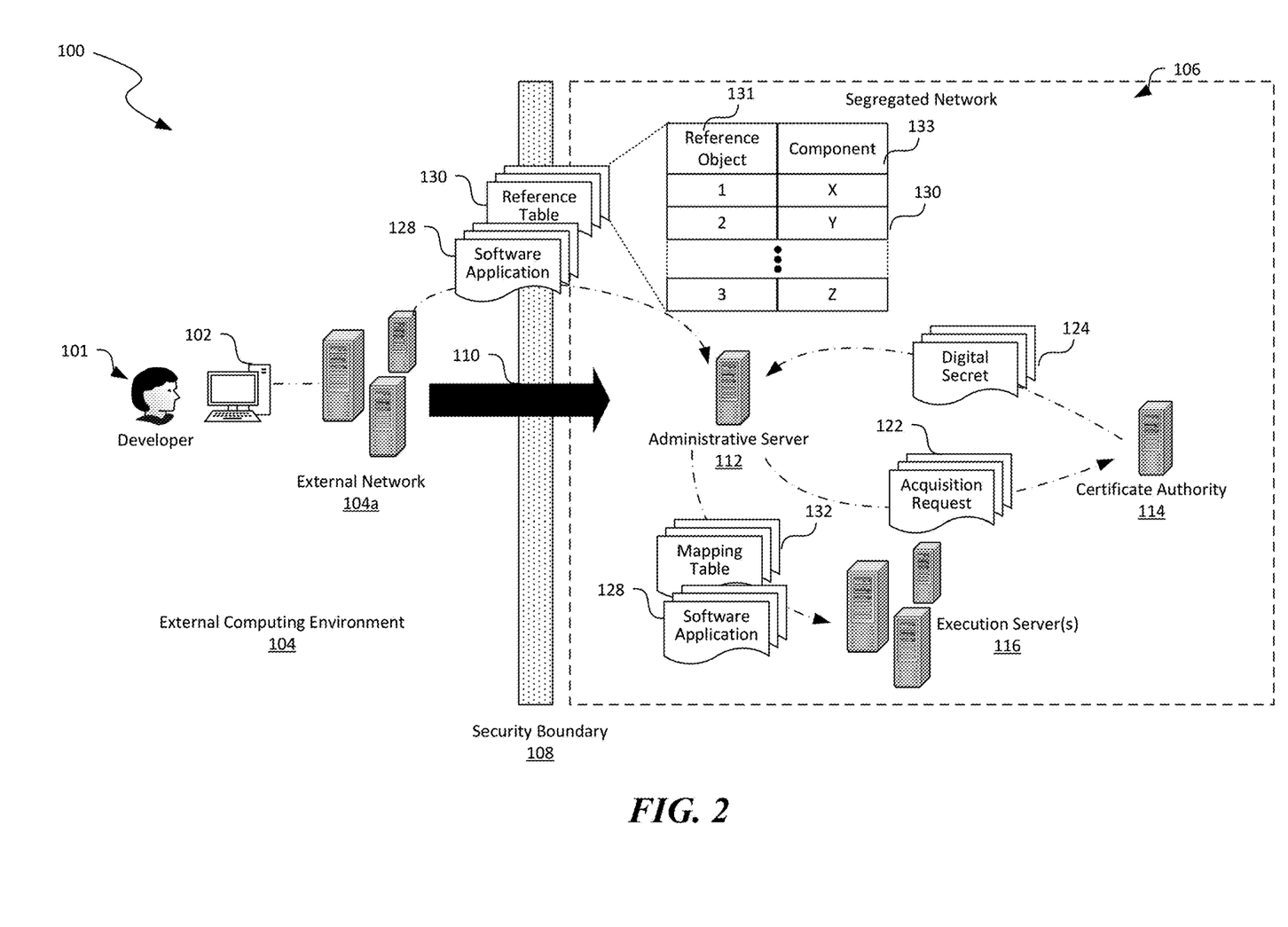
FIG. 2 is a schematic diagram illustrating another computing system implementing certificate management for a segregated network during a stage of operation in accordance with embodiments of the disclosed technology.

Even though provisioning of the digital secrets 124 is shown in FIG. 1A as being performed by the administrator 101', in some embodiments, the digital secrets 124 can be provisioned on an ad hoc basis. For example, as shown in FIG. 2, upon receiving the software application 128 with the reference table 130, the administrative server 112 can be configured to acquire digital secrets 124 for each of the reference objects 131 by transmitting an acquisition request 122 to and receiving the digital secrets 124 from the certificate authority 114. The administrative server 112 can then be configured to generate the mapping table 132 (shown in FIG. 1C) and deploy the software application 128 with the generated mapping table 132 to the execution servers 116, as described above with reference to FIGS. 1C and 1D.

Figure 3:
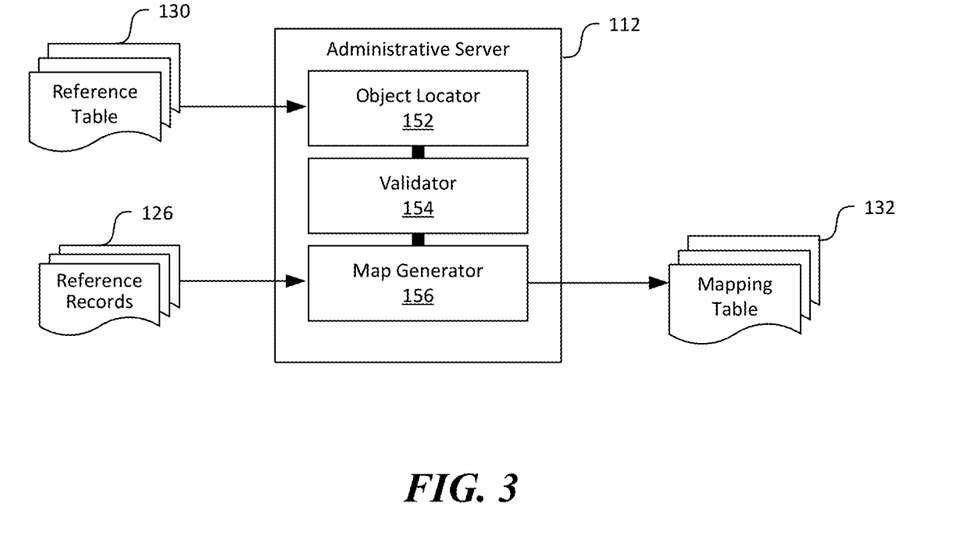
FIG. 3 is a schematic diagram illustrating example components of an administrative server in a segregated network configured in accordance with embodiments of the disclosed technology.

FIG. 3 is a schematic diagram illustrating example components of an administrative server 112 in a segregated network 106 configured in accordance with embodiments of the disclosed technology. As shown in FIG. 3, the administrative server 112 can include an object locator 152, a validator 154, and a map generator 156 operatively coupled to one another. Though particular modules of the administrative server 112 are shown in FIG. 3, in other embodiments, the administrative server 112 can include input/output and/or other suitable types of modules.

The object locator 152 can be configured to identify a reference object 131 (FIG. 1B) of a software application 128 (FIG. 1B). For example, as shown in FIG. 3, the object locator 152 can identify the reference object 131 by receiving or generating a reference table 130 associated with the software application 128. In other embodiments, the object locator 152 can identify the reference object 131 in other suitable manners. The object locator 152 can also be configured to determine whether a digital secret 124 (FIG. 1B) has already been provisioned for the reference object 131, by, for instance, looking up the reference records 126 in the datastore 111 (FIG. 1B). If one does not exist, the object locator 152 can be configured to provision a digital secret 124 for the reference object 131, as described above with reference to FIG. 1D. Otherwise, the object locator 152 can be configured to pass the digital secret 124 in the reference record 126 to the validator 154 for further processing.

The validator 154 can be configured to validate the existing digital secret 124. In one example, the validator 154 can be configured to determine whether an expiration date of the digital secret 124 has elapsed. In another example, the validator 154 can be configured to determine whether the digital secret 124 is a known compromised digital secret 124. In other examples, the validator 154 can be configured to validate the digital secret 124 in other suitable ways. In response to determining that the expiration date has elapsed, the validator 154 can be configured to instruct the object locator 152 to acquire a new digital secret 124. Otherwise, the validator 154 passes the digital secret 124 to the map generator 156.

The map generator 156 can be configured to generate and/or update the mapping table 132. An example of a mapping table 132 is shown in FIG. 1C. In one example, the map generator 156 can be configured to add components of the digital secret 124 as additional data to the reference table 130 to generate the mapping table 132. In other examples, the map generator 156 can be configured to generate the mapping table 132 in other suitable manners.

Figure 4A:
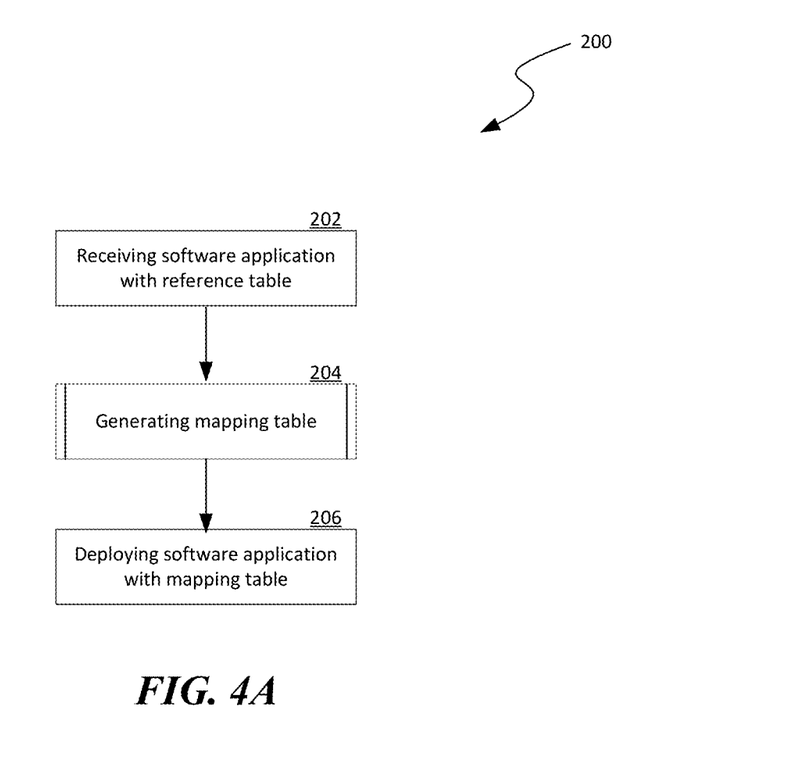
FIGS. 4A-4C are flowcharts illustrating processes of managing certificates in a segregated network in accordance with embodiments of the disclosed technology.
Figure 4B:
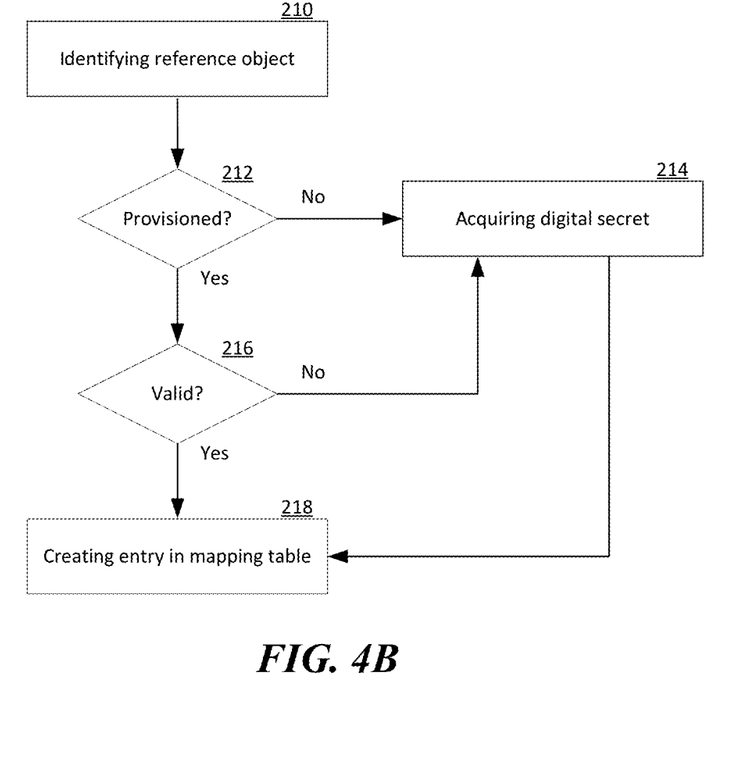
Figure 4C:
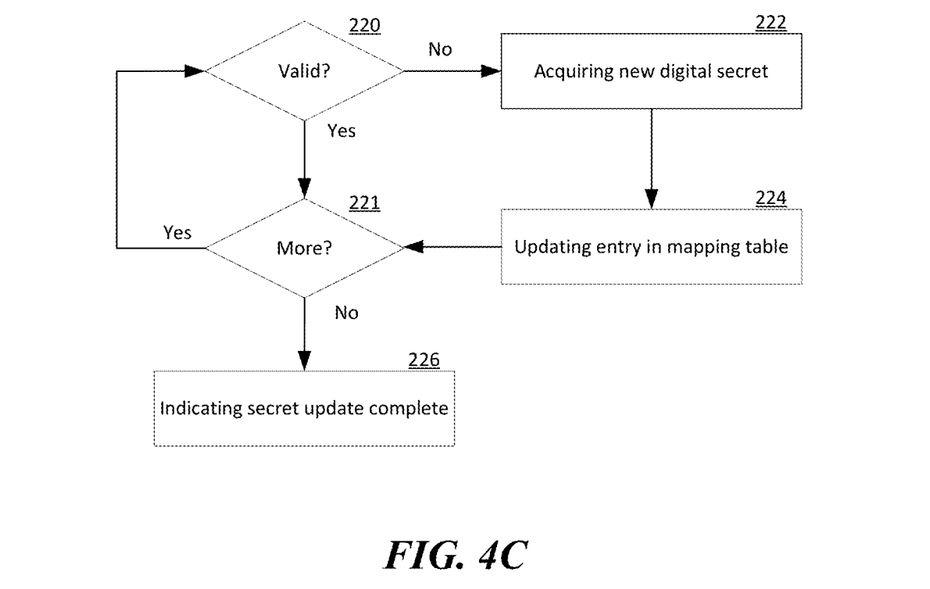

FIGS. 4A-4C are flowcharts illustrating processes of managing certificates in a segregated network in accordance with embodiments of the disclosed technology. Thought the processes are described below in the context of the computing system 100 in FIGS. 1A-2, embodiments of the processes can be implemented in other computing systems with additional and/or different components.

As shown in FIG. 4A, a process 200 can include receiving executable instructions of a software application at a segregated network at stage 202. The software application can include a reference table that contains entries individually identify a reference object used in the software application. The process 200 can then include generating a mapping table for the software application at stage 204. The mapping table 204 can include entries individually identify one of the reference objects in the software application and a digital secret or components thereof provisioned and managed independently at the segregated network. Example operations of generating the mapping table are described in more detail below with reference to FIG. 4B. The process 200 can then include deploying the software application for execution along with the generated mapping table at stage 206. During execution, the software application is configured to identify one of the reference objects and locate the corresponding digital secret from one of the entries in the generated mapping table based on the identified one of the reference objects.

FIG. 4B illustrates example operations for generating the mapping table. As shown in FIG. 4B, the operations can include identifying a reference object at stage 210. The operations can then include a decision stage 212 to determine whether a digital secret has already been provisioned, by, for example, looking up the reference records 126 in the datastore 111 (FIG. 1A). In response to determining that a digital secret has not already been provisioned, the operations can proceed to acquiring a digital secret at stage 214, by, for instance, requesting a digital secret from the certificate authority 114 (FIG. 1A). Otherwise, the operations proceed to another decision stage 216 to determine whether the existing digital secret is still valid. In response to determining that the existing digital secret is not valid, the operations revert to acquiring a digital secret at stage 214. Otherwise, the operations proceed to creating an entry for the reference object in the mapping table at stage 218. The entry also identifies the digital secret and/or components thereof.

FIG. 4C illustrates example operations for updating a mapping table. As shown in FIG. 4C, the operations can include the decision stage 220 to determine whether a digital secret in the mapping table is still valid. In response to determining that the existing digital secret is not valid anymore, the operations proceed to acquiring a new digital secret at stage 222. The operations then proceed to updating the entry in the mapping table corresponding to the digital secret that is no longer valid with the new digital secret at stage 224. The operations can then proceed to another decision stage 221 to determine whether at least one additional digital secret is present in the mapping table. In response to determining that the existing digital secret is still valid, the operations proceeds directly to the decision stage 221 to determine whether the mapping table includes at least one additional digital secret. In response to determining that the mapping table includes at least one additional digital secret, the operations revert to determining whether the at least one additional digital secret is still valid in the mapping table. Otherwise, the operations proceed to indicating that an update to the digital secrets is complete at stage 226.

Figure 5:
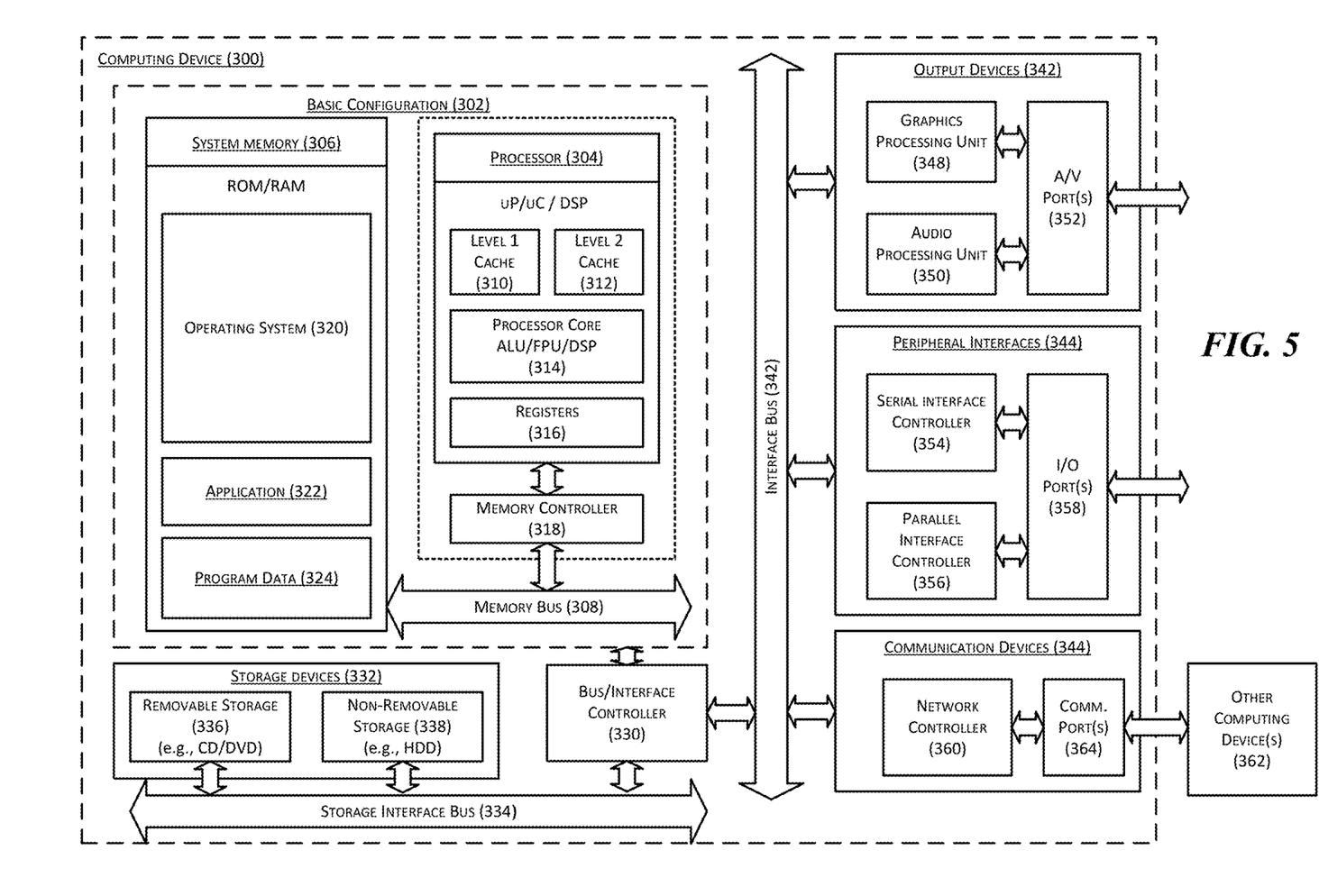
FIG. 5 is a computing device suitable for certain components of the computing system in FIGS. 1A-2.

FIG. 5 is a computing device 300 suitable for certain components of the computing system 100 in FIGS. 1A-2. For example, the computing device 300 can be suitable for the client devices 102, the administrative server 112, the certificate authority 114, or the execution servers 116 of FIGS. 1A-2. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 5 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for certificate management in a segregated network having one or more servers operatively coupled to one another, the method comprising:

receiving, at the segregated network, executable instructions of a software application and a reference table associated with the software application, the reference table containing entries identifying corresponding reference objects in the software application, wherein the segregated network is physically isolated from and having a unidirectional connection with an external computer network; and upon receiving the reference table, at the segregated network, identifying, digital certificates in the segregated network individually corresponding to one of the reference objects in the reference table;

generating a mapping table having entries individually identifying one of the reference objects of the software application and one of the digital certificates corresponding to the one of the reference objects; and deploying the software application to be executed on one or more of the servers in the segregated network along with the generated mapping table, and during execution of the deployed software application at one of the one or more servers in the segregated network, identifying one of the reference objects used in a software component of the software application;

searching the mapping table to locate one of the digital certificates from one of the entries in the generated mapping table corresponding to the identified one of the reference objects, and executing the software component of the software application using the boated one of the digital certificates corresponding to the identified one of the reference objects.

2. The method of claim 1 wherein receiving the executable instructions of the software application and the reference table includes receiving the executable instructions of the software application and the reference table via the unidirectional connection between the segregated network and the external computing computer network, and wherein deploying the software application in the segregated network includes deploying the software application in the segregated network with the generated mapping table without transmitting any data of the digital certificates from the segregated network to the external computing environment.

3. The method of claim 1, further comprising:
receiving, at the segregated network, a list of the reference objects prior to receiving the executable instructions of the software application; and
in response to receiving the list of the reference objects, obtaining, independently in the segregated network, the digital certificates individually corresponding to one of the reference objects; and
storing the obtained digital certificates and corresponding reference objects as reference records in a datastore in the segregated network; and
wherein identifying the digital certificates includes identifying the digital certificates based on the reference records in the datastore.

4. The method of claim 1 wherein identifying the digital certificates includes, for each of the reference objects identified in the reference table:
determining whether a datastore in the segregated network contains a reference record identifying the each of the reference objects and &one of the digital certificates; and
in response to determining that the datastore contains the reference record identifying the each of the reference objects and the one of the digital certificates, associating the one of the digital certificates with the each of the reference objects.

5. The method of claim 1 wherein identifying the digital certificates includes, for each of the reference objects identified in the reference table:
determining whether a datastore in the segregated network contains a reference record identifying the each of the reference objects and one of the digital certificates; and
in response to determining that the datastore does not contain a reference record identifying the each of the reference objects and one of the digital certificates, obtaining, from a certificate authority, a digital certificate of the each of the reference objects; and
associating the obtained digital certificate with the each of the reference objects.

6. The method of claim 1 wherein identifying the digital certificates includes, for each of the reference objects identified in the reference table:
determining whether a datastore in the segregated network contains a reference record identifying the each of the reference objects and one of the digital certificates; and
in response to determining that the datastore contains a reference record identifying the each of the reference objects and the one of the digital certificates, determining, whether the one of the digital certificates is still valid; and in response to determining that the one of the digital certificates is still valid, associating the one of the digital certificates with the each of the reference objects.

7. The method of claim 1 wherein identifying the digital certificates includes, for each of the reference objects identified in the reference table:
determining whether a datastore in the segregated network contains a reference record identifying the each of the reference objects and one of the digital certificates; and
in response to determining that the datastore contains a reference record identifying the each of the reference objects and the one of the digital certificates, determining, whether the one of the digital certificates is still valid; and
in response to determining that the one of the digital certificates is not valid,
obtaining, from a certificate authority, a new digital certificate for the each of the reference objects; and
associating the obtained new digital certificate with the each of the reference objects.

8. The method of claim 1, further comprising:
subsequent to deploying the software application to the one or more of the servers in the segregated network, determining whether the digital certificates in the mapping table are still valid; and
in response to determining that one of the digital certificates in the mapping table is not valid,
obtaining, from a certificate authority, a new digital certificate for the corresponding reference object in the mapping table; and
updating the mapping table with the new digital certificate without modification to the executable instructions of the software application.

9. The method of claim 1 wherein identifying the digital certificates includes:
upon receiving the reference table, at the segregated network,
obtaining, from a certificate authority, one of the digital certificates for each of the reference objects in the reference table; and
associating the obtained digital certificates with the each of the reference objects in the reference table.

10. A computing device in a segregated network having one or more servers physically isolated from and having a unidirectional connection with an external computer network, the computing device comprising:
a processor; and
a memory having instructions executable by the processor to cause the computing device to:
receive, at the segregated network, executable instructions of a software application and a reference table associated with the software application, the reference table containing a data entry identifying a reference object in the software application;
upon receiving the reference table, at the computing device,
identify a digital certificate available in the segregated network and corresponding to the reference object in the reference table;
generate a mapping table having an entry identifying the reference object and the digital certificate; and
transmit the executable instructions of the software application to be executed on the one or more of the servers in the segregated network along with the generated mapping table; and during execution of the software application,
identify the reference object used in a software component of the software application;
search the mapping table to locate the digital certificate execution of the software applicationcorresponding to the identified reference object; and
execute the software component of the software application using the corresponding to the identified reference object.

11. The computing device of claim 10 wherein the memory includes additional instructions executable by the processor to cause the computing device to:
receive data identifying the reference object prior to receiving the executable instructions of the software application; and
in response to receiving the data identifying the reference object,
obtain the digital certificate corresponding to the reference object from a certificate authority; and
store the obtained digital certificate and corresponding reference object as a reference record in a datastore in the segregated network.

12. The computing device of claim 11 wherein to identify the digital certificate includes to identify the digital certificate based on the reference record in the datastore.

13. The computing device of claim 10 wherein to identify the digital certificate includes to:
upon receiving the reference table,
obtain, from a certificate authority, the digital certificate for the reference object in the reference table; and
create and store, in a datastore, a reference record identifying the obtained digital certificate and the reference object in the reference table.

14. The computing device of claim 10 wherein the memory includes additional instructions executable by the processor to cause the computing device to:
determine, whether the digital certificate is still valid; and
in response to determining that the digital certificate is still valid, generate the mapping table using the digital certificate.

15. The computing device of claim 10 wherein the memory includes additional instructions executable by the processor to cause the computing device to:
determine, whether the digital certificate is still valid; and
in response to determining that the digital certificate is not valid,
obtain, from a certificate authority, a new digital certificate for the reference object; and
generate the mapping table using the obtained new digital certificate.

16. The computing device of claim 10 wherein the memory includes additional instructions executable by the processor to cause the computing device to:
subsequent to deploying the software application to the one or more of the servers in the segregated network, determine whether the digital certificate in the mapping table is still valid; and
in response to determining that the digital certificate in the mapping table is not valid,
obtain, from a certificate authority, a new digital certificate for the reference object in the mapping table; and
update the mapping table with the new digital certificate without modification to the executable instructions of the software application.

17. A method for certificate management in a segregated network having one or more servers operatively coupled to one another and physically isolated from and having a unidirectional connection with an external computer network, the method comprising:
upon receiving, at the segregated network, executable instructions of a software application and a reference table associated with the software application and containing entries identifying corresponding reference objects in the software application,
identifying, for the reference objects identified in the reference table, digital certificates independently obtained by the segregated network;
generating a mapping table having entries individually identifying one of the reference objects of the software application and data representing one of the digital certificates independently obtained by the segregated network; and
deploying for execution on one or more of the servers in the segregated network, the software application along with the generated mapping table; and
during execution of the deployed software application at one of the one or more servers,
identifying one of the reference objects used in a software component of the software application;
dereferencing the identified one of the reference objects by locating the one of the digital certificates in one of the entries in the generated mapping table corresponding to the identified one of the reference objects; and
executing the software component of the software application using the located one of the digital certificates corresponding to the identified one of the reference objects.

18. The method of claim 17, further comprising:
receiving, at the segregated network, a list of the reference objects prior to receiving the executable instructions of the software application; and
in response to receiving the list of the reference objects, obtaining, independently in the segregated network, the digital certificates individually corresponding to one of the reference objects; and
storing the obtained digital certificates and corresponding reference objects as reference records in a datastore in the segregated network; and
wherein identifying the digital certificates includes identifying the digital certificates based on the reference records in the datastore.

19. The method of claim 17 wherein identifying the digital certificates includes, for each of the reference objects identified in the reference table:
determining whether a datastore in the segregated network contains a reference record identifying the each of the reference objects and one of the digital certificates; and
in response to determining that the datastore contains a reference record identifying the each of the reference objects and one of the digital certificates, associating the one of the digital certificates with the each of the reference objects.

20. The method of claim 17 wherein identifying the digital certificates includes, for each of the reference objects identified in the reference table:
determining whether a datastore in the segregated network contains a reference record identifying the each of the reference objects and one of the digital certificates; and in response to determining that the datastore does not contain a reference record identifying the each of the reference objects and one of the digital certificates, obtaining, from a certificate authority, the one of digital certificates of the each of the reference objects; and associating the obtained one of the digital certificates with the each of the reference objects.

\* \* \* \* \*